United States Patent [19]

Shimizu

[11] Patent Number: 4,825,972
[45] Date of Patent: May 2, 1989

[54] STEERING SYSTEM FOR VEHICLES

[75] Inventor: Yasuo Shimizu, Saitama, Japan

[73] Assignee: Honda Giken Kogyo Kabushiki Kaisha, Tokyo, Japan

[21] Appl. No.: 18,716

[22] Filed: Feb. 25, 1987

[30] Foreign Application Priority Data

Feb. 25, 1986 [JP] Japan .................................. 61-39457
Feb. 25, 1986 [JP] Japan .................................. 61-39458
Feb. 27, 1986 [JP] Japan .................................. 61-43342

[51] Int. Cl.⁴ ............................................ B62D 5/04
[52] U.S. Cl. ............................ 180/79.1; 364/424.01
[58] Field of Search ........................ 180/79.1, 142; 74/388 PS; 364/424

[56] References Cited

U.S. PATENT DOCUMENTS 4,577,716  3/1986  Norton .............................. 180/79.1
4,664,211  5/1987  Oshita ........................... 180/79.1 X Primary Examiner—John A. Pekar
Attorney, Agent, or Firm—Lyon & Lyon

[57] ABSTRACT

A steering system for vehicles in which the steered wheels may be restored to the neutral position in an automatic manner or at the discretion of the driver when necessary. The steering system includes a steered wheel, a steering mechanism for transmitting a steering operation of a steering wheel to the steering wheel, and a connecting mechanism operably connected to the steering mechanism for restoring the steered wheel from a current position to a neutral position.

11 Claims, 7 Drawing Sheets

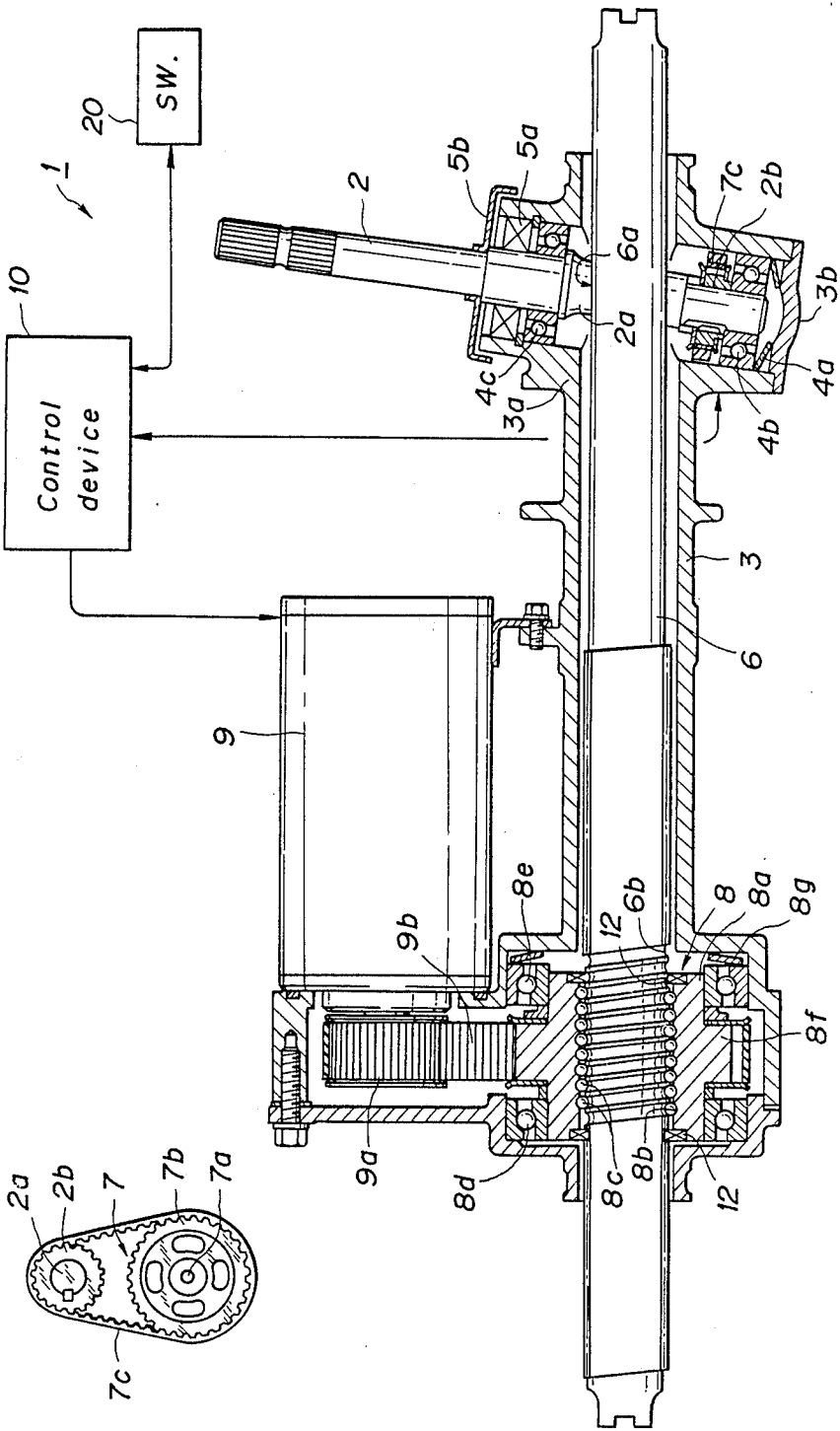
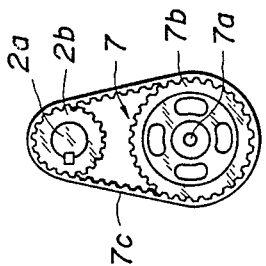

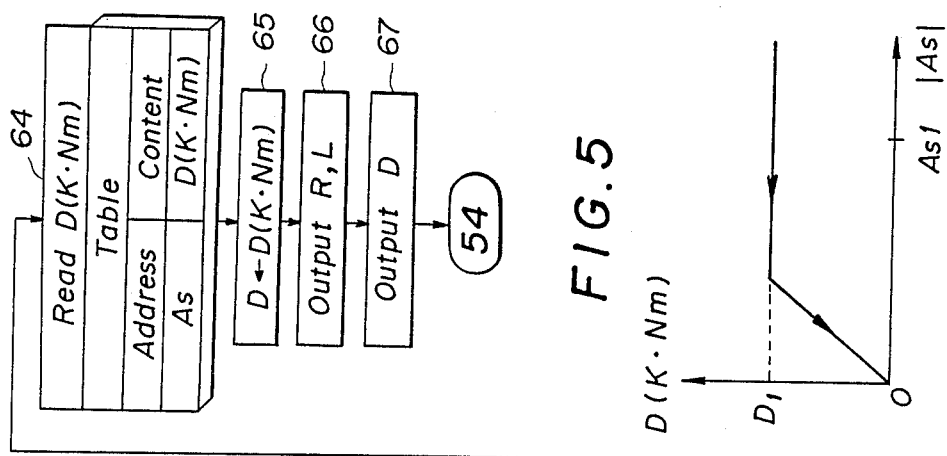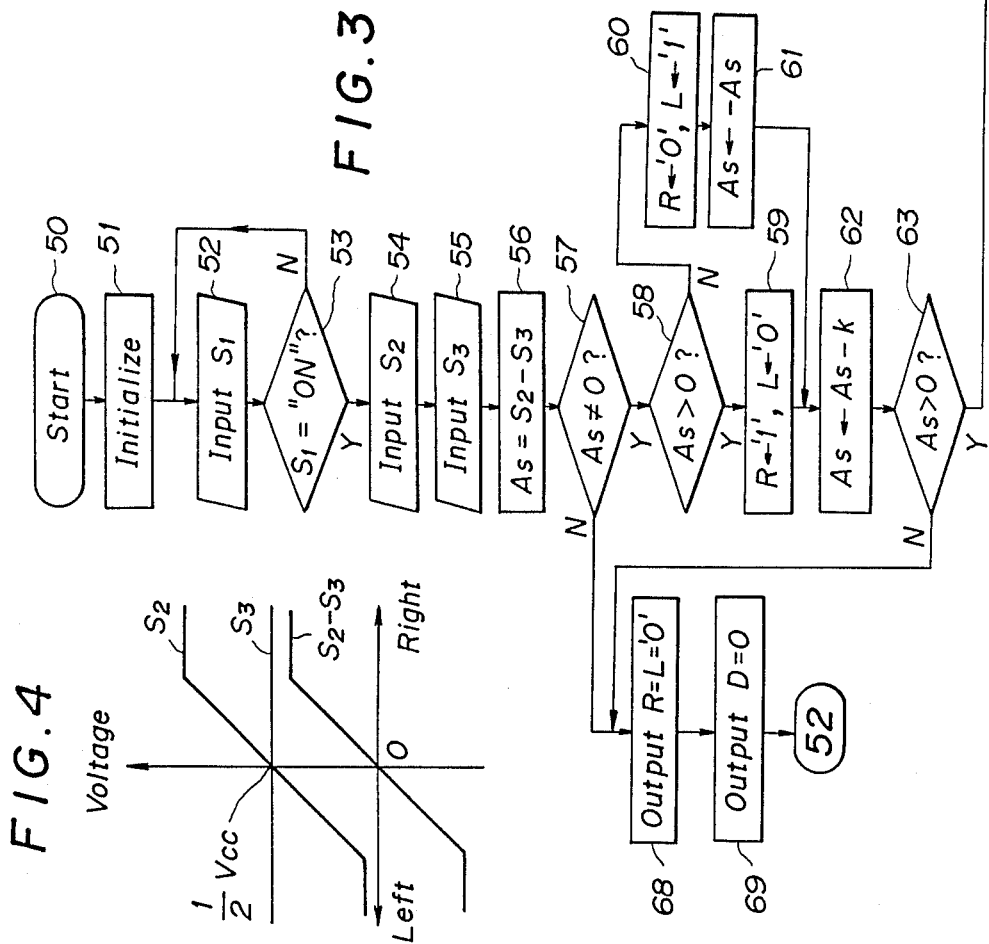

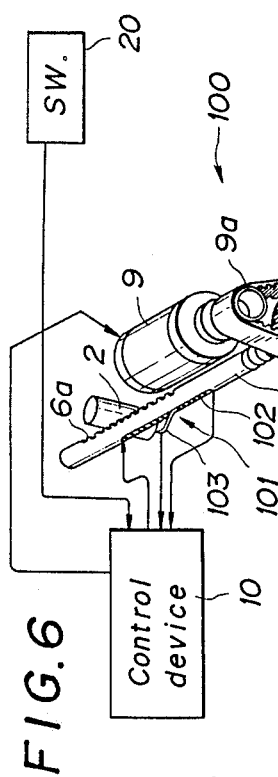
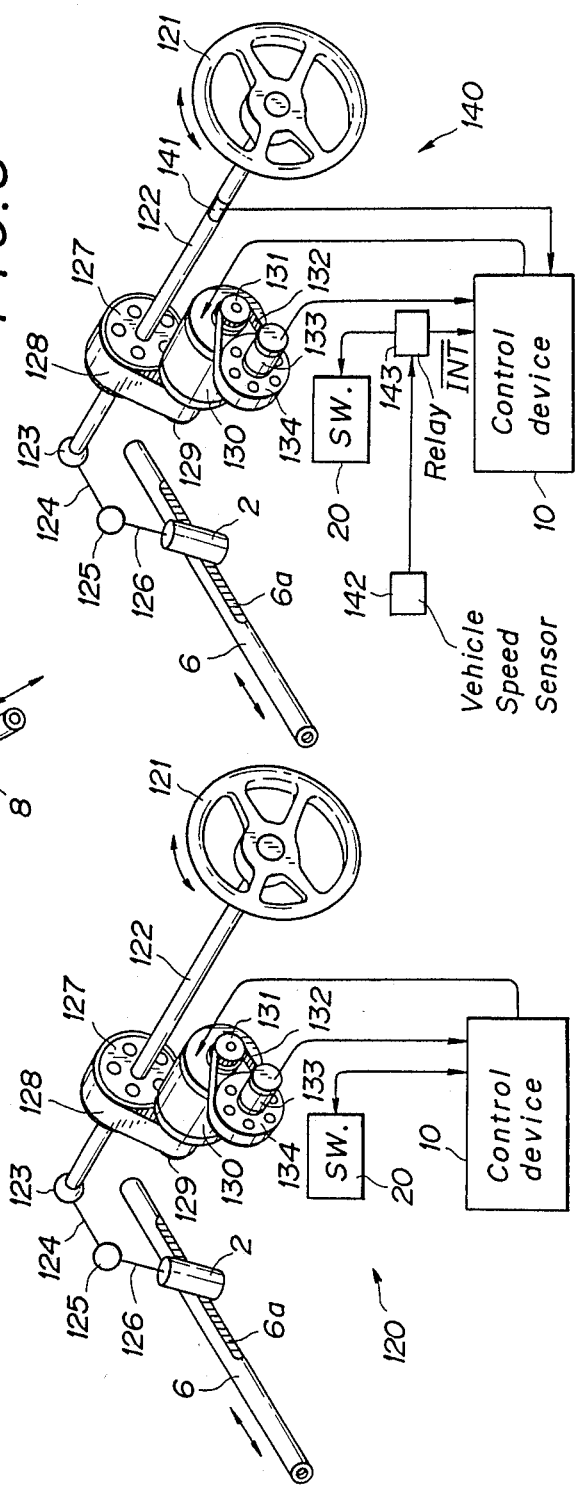
FIG.6
FIG.7
FIG.8

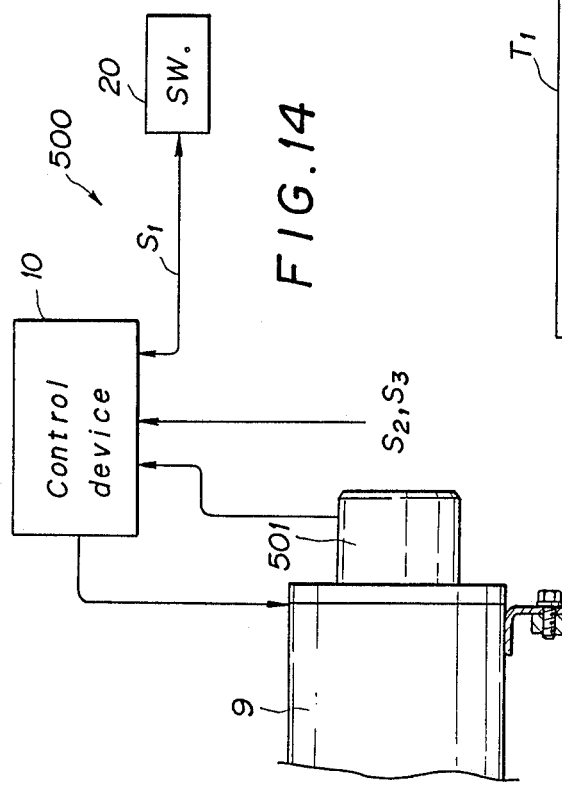
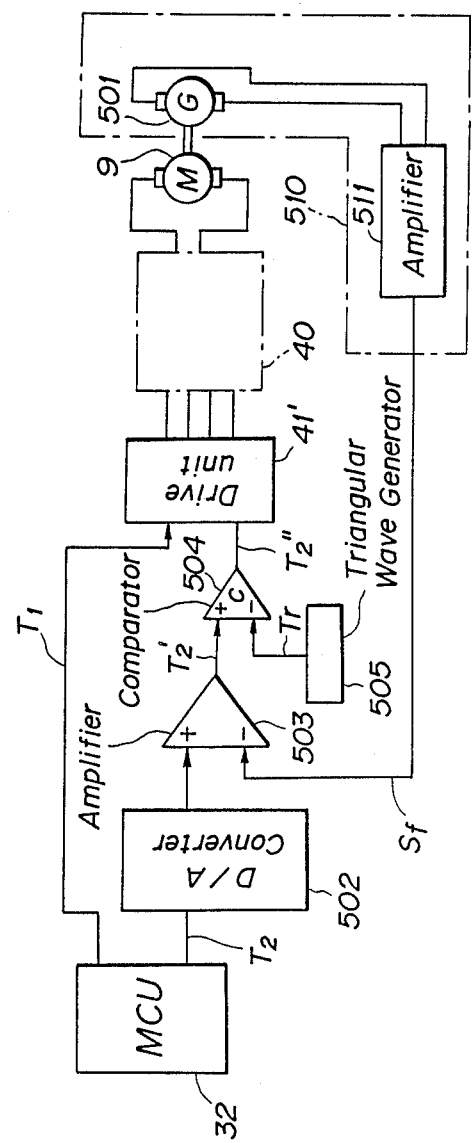
FIG. 14
FIG. 15

STEERING SYSTEM FOR VEHICLES

BACKGROUND OF THE INVENTION

1. Field of the Invention

The present invention relates to a steering system for vehicles.

2. Description of Relevant Art

In the steering system for vehicles, rotation of a steering wheel is transmitted through a steering shaft and a rack and pinion mechanism or the like to steered wheels, turning these. When a vehicle turns while traveling with a higher than predetermined speed with the steered wheels turned in either direction, the front wheels which in most cases are the steered ones have a restoring force acting thereon with a tendency to return them to the neutral position. The restoring force is resulted from wheel alignment of the front wheels and self-aligning torque due to deformation of their tires. When the steered wheels are turned at an angle, if the driver does apply no steering forces to the steering wheel, with or without letting the hold go, they tend to return to the neutral position with the restoring force.

The restoring force however is hardly produced when the vehicle travels with a very low speed or while it is in an almost standing state. It is somewhat troublesome in a vehicle parked in a narrow road or driven into a small garage to return the front wheels to the neutral position. It is more or less difficult to complete parking or garaging at such places with the front wheels restored to the neutral position. It however is desirable to have the front wheels as the steered wheels restored to the neutral position, when departing from such places. In a four-wheel steered vehicle, it is desirable that all the four wheels are restored to the neural position.

The present invention has been achieved to effectively solve such a problem in conventional steering systems for vehicles.

SUMMARY OF THE INVENTION

An object of the present invention is to provide a steering system for vehicles in which the steered wheels can be restored to the neutral position in an automatical manner or at the discretion of the driver, when necessary.

To achieve such an object, the present invention provides a steering system for vehicles comprising a steered wheel, a steering mechanism for transmitting a steering operation of a steering wheel to the steered wheel, and a means which is operatively connected to the steering mechanism and restores the steered wheel from a current position thereof to a neutral position thereof, as necessary.

The above and further features, objects and advantages of the present invention will more fully appear from the following detailed description of the preferred embodiment of the invention when the same is read in conjunction with the accompanying drawings.

BRIEF DESCRIPTION OF THE DRAWINGS

FIG. 1A is a longitudinal sectional view of an essential part of a steering system for vehicles according to a first embodiment of the invention, which is equipped with a neutral position restoring device for steered wheels.

FIG. 1B is a plan view of a potentiometer provided at the end of a steering shaft.

FIG. 3 is a flow-chart of control processes to be executed by a micro-computer unit in the control circuit.

FIG. 4 is a graph describing the output characteristic of a detection signal of a steered position.

FIG. 5 is a graph showing a relationship between a duty value of a motor drive signal and the steered position.

FIG. 6 is a perspective view of a steering system for vehicles according to a first modification of the first embodiment.

FIG. 7 is a perspective view of a steering system for vehicles according to a second modification of the first embodiment.

FIG. 8 is a perspective view of a steering system for vehicles according to a third modification of the first embodiment.

FIG. 14 is a diagrammatic view of a motor speed detecting generator provided in a steering system for vehicles according to a fifth embodiment of the invention, which is equipped with a neutral position restoring device for steered wheels.

FIG. 15 is a partial circuit diagram of a control circuit in the steering system according to the fifth embodiment.

DETAILED DESCRIPTION OF THE PREFERRED EMBODIMENT

Figure 2:
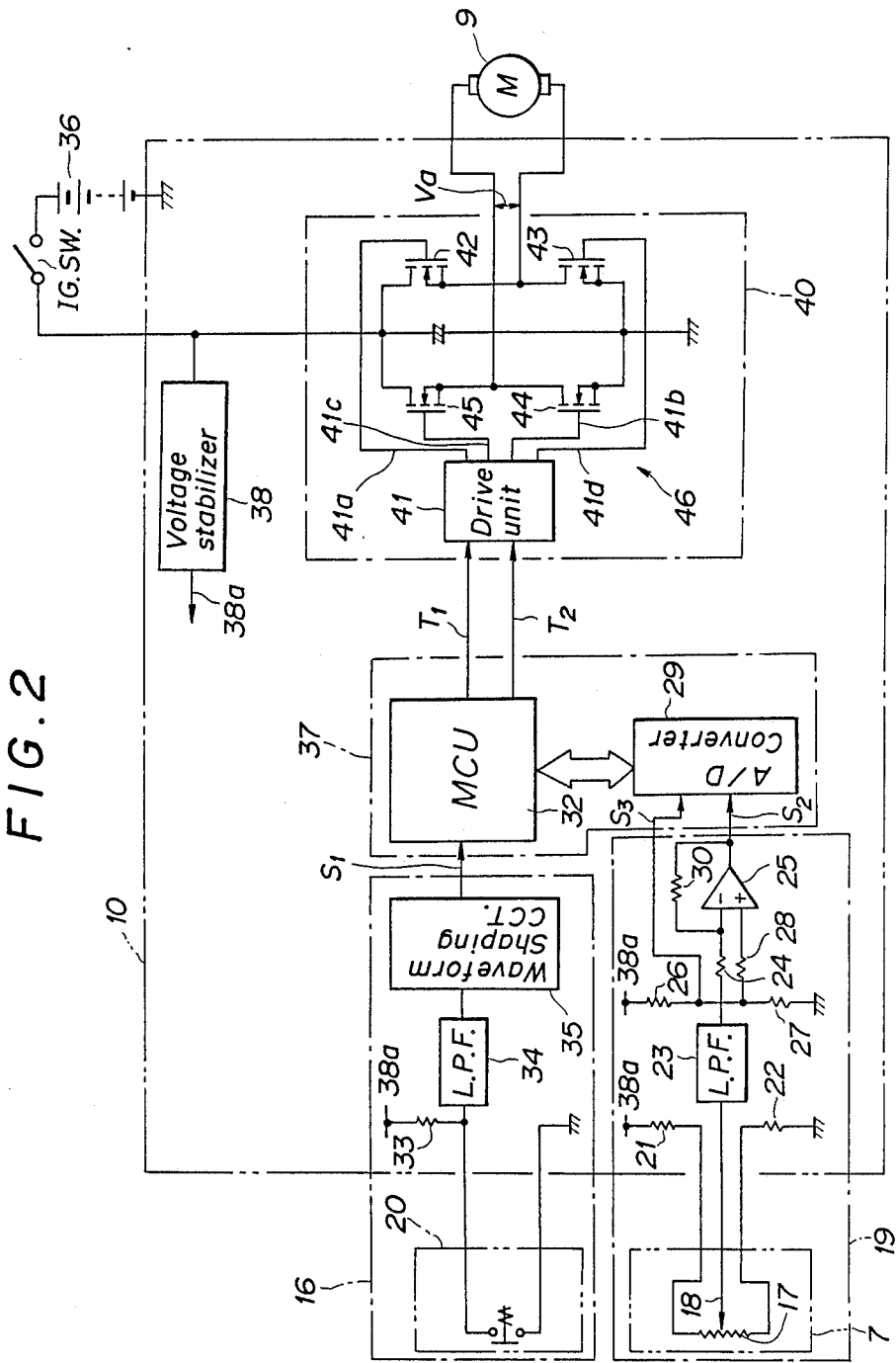
FIG. 2 is a circuit diagram of a control circuit of the neutral position restoring device.

Referring to FIG. 1A, designated at reference numeral 1 is a steering system for vehicles according to a first embodiment of the present invention. The system 1 includes a steering shaft 2 connected at the upper end thereof through an unshown universal joint and shaft member to an unshown steering wheel. The lower end of the steering shaft 2 is inserted into a boss portion 3a of a rack casing 3. The boss portion 3a is closed with a cap 3b at the downside opening. The steering shaft 2 is rotatably supported, while restricted in axial movement, by angular contact bearings 4b, 4c which are pushed against the cap 3b, with a plate spring 4a put therebetween. The upside opening of the boss portion 3a has a seal member 5a and a dust boot 5b fitted thereto. The lower end part of the steering shaft 2 is integrally provided with a pinion gear 2a. The gear 2a meshes with rack teeth 6a formed on the backside of a rack shaft 6 which is axially movably inserted through the casing 3. The rack shaft 6 is connected at both ends thereof through unshown tie-rods to the knuckles of unshown front wheels as steered wheels, respectively. Rotation of the steering wheel is changed by the pinion gear 2a into a straight-linear motion of the rack shaft 6 to thereby turn the front wheels.

A toothed small-diameter pulley 2b is fixed on the lowest part of the steering shaft 2. The pulley 2b is interconnected by a timing belt 7c with a toothed large-diameter pulley 7b fixed on an input shaft 7a of a rotary potentiometer 7, as shown in FIG. 1B. The shaft 7a is provided with a slider 18 in sliding contact with a resistance coil 17, as in FIG. 2. Rotation of the steering shaft 2 is transmitted to the input shaft 7a, while reduced in speed. The potentiometer 7 outputs a voltage representing a steered angle As of the steering shaft 2, i.e. a steered position thereof, so that it can detect a neutral position of the steering wheel as well, where As=0. The steered angle As of the steering shaft 2 is that of the steering wheel and corresponds to a turned position of the steered wheels. Hereinafter, the steered angle As will substitute for the turned position.

The rack shaft 6 has at the left part thereof a spiral groove portion 6b formed along the outer circumference. The spiral groove portion 6b is fitted in another spiral groove portion 8b which is formed along the inner circumference of a ball bearing nut 8a, with a plurality of rolling balls 8c put therebetween. The balls 8c advance along a spiral path defined by grooves of the portions 6b, 8b, circulating through a return path formed in the nut 8a. The nut 8a is rotatably supported at both ends thereof in the casing 3 by means of angular contact bearings 8d 8e which, are axially biased with a plate spring 8g to eliminate axial play. The clearance between the spiral groove portions 6b, 8b is sealed with seal members 12, 12 at both ends of the nut 8a. A ball and thread mechanism 8 is constituted with the elements 8a, 8b, 8c, 8d, 8e and 6b. Rotation of the nut 8a is transmitted to the rack shaft 6 in a smoothed manner through the balls 8c, whereby the shaft 6 is caused to straight-linearly move. A direct-current motor 9 of which the axis of rotation is parallel to the rack shaft 6 is fixed to the casing 3, at a location facing the ball and thread mechanism 8. The motor 9 has a toothed small-diameter pulley 9a fixed on an unshown output shaft thereof. The pulley 9a is connected through a timing belt 9b to a toothed large-diameter pulley 8f formed on the outer circumference of the nut 8a. Rotation of the motor 9 is transmitted to the nut 8a, while reduced in speed.

The potentiometer 7 has an output signal thereof fed to a control circuit 10. The control circuit 10 is fed with another signal from a pushbutton switch 20 of which the operation element is so located near the steering wheel that its uppermost surface lies at an intermediate depth of a small-diameter concave portion formed relatively deeply in an instrument panel. The circuit 10 is electrically connected to the motor 9, to effect a motor drive control as described later. The switch 20 may preferably be provided with a locking mechanism to prevent unintended operations thereof while traveling.

The control circuit 10 is described below with reference to FIG. 2.

Represented by reference numeral 32 is a micro-computer unit (hereinafter called MCU). The MCU 32 receives a directly input signal $S_1$ from a switching circuit 16 and a pair of detection signals $S_2$, $S_3$ input from a steered angle detection circuit 19 through an analogue to digital converter 29, following a command from the MCU 32 itself. The detection circuit 19 serves to detect a turned position of the steered wheels. The MCU 32 feeds a motor drive circuit 40 with a pair of motor drive control signals $T_1$, $T_2$ in dependence on the signals $S_1$ to $S_3$, as described later, so that a motor drive control signal generator 37 consists of the MCU 32 provided with the converter 29. The drive circuit 40 functions to drive the motor 9 in dependence on the control signals $T_1$, $T_2$. Electric power to the circuit 40 is applied from a battery 36 installed in the vehicle, through an ignition switch. The control circuit 10 includes a voltage stabilizer 38 having an output terminal 38a for providing other circuitries with a constant voltage $V_1$, as described later. Also the stabilizer 38 is connected through the ignition switch to the battery 36.

The switching circuit 16 comprises the pushbutton switch 20, a low-pass filter 34, and a waveform shaping circuit 35. The switch 20 is connected at one end thereof to a grounded common line and at the other end through a resistor 33 to the output terminal 38a of stabilizer 38, and provides an on-off signal to the filter 34, where its noise components due to make-brake operations of switch 20 are eliminated. The noise-filtered signal is conducted from filter 34 to the shaping circuit 35, where its waveform is shaped rectangular to provide the signal $S_1$ to be input to an input/output port of the MCU 32. The signal $S_1$ is kept at a "high" level (=constant voltage $V_1$) while the switch 20 remains off, and takes a "low" level when it is turned on.

The steered angle detection circuit 19 comprises the potentiometer 7, a low-pass filter 23, and a differential type operation amplifier 25. The resistance coil 17 of the potentiometer 7 is connected at one end thereof through a resistor 21 to the output terminal 38a of stabilizer 38 and at the other end through a resistor 22 to the common line. The slider 18 in contact with the coil 17 outputs a divided voltage signal to the filter 23, where its noise components due to the sliding contact are eliminated. The noise-filtered signal from filter 23 is conducted through a resistor 24 to an inverted input terminal of the amp lifer 25, while a non-inverted input terminal thereof is fed with the constant voltage $V_1$ of stabilizer 38 as half-divided by a combination of resistors 26, 27 and sent through a resistor 28. The constant voltage $V_1$ hllf-divided by the resistors 26, 27 is used also in the form of a reference signal to be sent as the signal $S_3$ to the A/D converter 29. An output terminal of the amplifier 25 provides the signal $S_2$ which also is sent to the converter 29. The signal $S_2$ is a steered angle representative signal. The amplifier 25 has a resistor 30 interconnecting the output terminal with the inverted input terminal thereof, which constitutes a feedback circuit.

The MCU 32 includes necessary unshown devices such as the I/O port, RAM and ROM memories, registers, a CPU, and a clock generator which receives a clock pulse from a quartz oscillator. While the ignition switch is turned on, the MCU 32 is put in an energized state, where the input signals $S_1$ to $S_3$ from circuits 16, 19 are processed to output the control signals $T_1$, $T_2$, following a stored program in the memories. The signal $T_1$ is responsible for control of the direction of rotation of motor 9, and $T_2$ for that of the effective value of an armature voltage Va of motor 9.

The motor drive circuit 40 comprises a drive unit 41 and a switching bridge circuit 46 consisting of four arms having field effect transistors (hereinafter called FET's) 42, 43, 44, 45, respectively. FET's 42, 45 constituting neighboring two of the four arms have the drains thereof joined with each other to provide a current source node to be connected to the positive pole of battery 36. FET's 43, 44 constituting the remaining two arms have the sources thereof joined with each other to provide a current sink node to be connected to the common line and to the negative pole of battery 36. The source and sink nodes are connected to each other via an electrolytic capacitor. A joining node between the source of FET 42 and the drain of FET 43 and another joining node between the source of FET 45 and the drain of FET 44 cooperate with each other to provide a pair of output terminals of bridge circuit 46 which are connected to a pair of input terminals of motor 9, respectively. The bridge circuit 46 exhibits a switching function for power application under control of the drive unit 41 which has four output terminals 41a, 41b, 41c, 41d connected to the gates of the respective FET's 42, 44, 45, 43.

The drive unit 41 outputs a continuous drive signal from the output terminal 41a or 41c to thereby hold on FET 42 or 45 and at the same time an intermittent drive signal from the output terminal 41b or 41d to thereby turn on FET 44 or 43, so that FET's 42, 44 on paired bridge arms or FET's 45, 43 on the remaining bridge arms are driven in combination in an exclusive manner depending on the direction of rotation responsible control signal $T_1$, whereby the motor 9 is driven in a corresponding direction. The intermittent drive signal comprises a series of rectangular carrier pulses occurring at a battery level Vcc with a constant frequency, as they are PWM (pulse duration modulation) controlled in dependence on the armature voltage responsible control signal $T_2$. The PWM-controlled pulses are input to the gate of FET 44 or 43 in the exclusive manner described.

In other words, the motor drive circuit 40 functions to drive the motor 9 so that the direction of rotation and output power (the number of revolutions per unit time and torque) of motor 9 are controlled with the FET's 42, 44 driven in combination in continuous and PWM manners, respectively, or with the FET's 45, 43 driven in combination in like manners, depending on the control signals $T_1$, $T_2$ from MCU 32.

In the case the FET's 42, 44 are driven, the magnitude as effective value of armature voltage Va across motor 9 is proportional to the duration of PWM-controlled pulses in the drive signal output from the terminal 41b of drive unit 41 and the polarity of voltage Va is such that an armature current Ia runs in either predetermined direction to rotate the motor 9 clockwise. In the case the FET's 45, 43 are driven, the magnitude of voltage Va is proportional to the pulse duration of the drive signal from the output terminal 41d of drive unit 41 and the polarity thereof is such that an armature current Ia runs in the opposite direction to rotate the motor 9 counterclockwise.

Internal functions of the MCU 32 are described below.

FIG. 3 is a flow-chart schematically showing various control processes in the MCU 32. Reference numerals 50 to 69 represent process steps.

With the ignition switch turned on, electric power is applied to the MCU 32 and other circuitries, permitting control functions thereof to be exhibited.

At step 51, the registers of MCU 32 and data in the RAM are initialized, as well as associated circuits.

At step 52, the signal $S_1$ from switching circuit 16 is read. At step 53, a judgment is made as to whether or not the switch 20 is turned on. In the case the switch 20 is on, the signal $S_1$ is at "low" level. If it is off, $S_1$ is at "high" level (the level of constant voltage $V_1$) When the switch 20 is judged to be on at the step 53, the program flow goes to step 54. If it is not so, the flow again goes to the step 52. The flow keeps idling a round between the steps 52, 53, unless the switch 20 is turned on.

At step 54, the steered angle signal $S_2$ from detection circuit 19 is read. The signal $S_2$ represents a turned position of the steered wheels. The signal $S_2$ has such a relationship to the steered angle As as shown in FIG. 4. At step 55, the reference voltage signal $S_3$ is read. The signal $S_3$ is at a constant level irrespective of the current value of steered angle As.

At step 56, an operation of $S_2-S_3$ is made, letting the result be a value of steered angle As. As in FIG. 4, the result of $S_2$ minus $S_3$ is substantially proportional to the steered angle As.

At step 57, a judgment is made as to whether or not the value of steered angle As is unequal to zero. It thus is judged whether or not the steering wheel is out of the neutral position. In the case the value of As is unequal to zero, the program flow goes to step 58. If it is not so, the flow goes to step 68.

At the step 58, it is judged whether the steered angle As has a positive value or not. The steered angle As has a positive value when the steering wheel is steered to the right of the neutral position, and a negative one when it is steered to the left, as in FIG. 4. In the case the value of steered angle As is positive, the program flow goes to step 59. If it is not so, the flow goes to step 60.

At the step 59, a pair of flags R, L responsible for the direction of rotation of motor 9 are set and reset such that R="1" and L="0". Thereafter, the program flow goes to step 62.

At the step 60, the flags R, L are reset and set such that R="0" and L="1". Then, at step 61, the value of steered angle As is replaced by the absolute value thereof, so that −As substitutes for As. Thereafter, the program flow goes to the step 62.

The flag R when set to "1" serves to rotate the motor 9 in such a direction that the steering wheel steered to the right of the neutral position is urged to return to the neutral. When the flag L is set to "1", the motor 9 is caused to rotate in such a direction that the steering wheel steered to the left of the neutral position tends to return to the neutral. When the program flow has come to the step 62, the steered angle As is given in the form of an absolute value.

At the step 62, the absolute value of steered angle As is replaced by As−k, to thereby provide a dead zone in which the neutral position of the steering wheel lies, where k is a relatively small predetermined value.

At step 63, a judgment is made as to whether or not the value of thus obtained As is larger than zero. In the case the value of As is larger than zero, the program flow goes to step 64. If it is not so, the flow goes to the step 68.

At the step 64, a record in a written table in the ROM is directly read in an address designation manner in dependence on the value of As. The table has stored therein data on a duty value D(K·Nm) in absolute form, which has such a relationship to the absolute value of steered angle As as shown in FIG. 5. The designation of an address in the table is executed by using the absolute value of steered angle As multiplied by a predetermined factor to obtain an integer.

At step 65, the duty value D(K·Nm) in absolute form substitutes for an actual duty value D which represents the pulse duration of the PWM-controlled drive signal to be output from the terminal 41b or 41d of drive unit 41 to the FET 44 or 43. For a certain instantaneous value Di of the actual duty value D, the armature voltage Va to be applied across the motor 9 is determined such that Va=Vcc×Di, where Vcc is the supply voltage from battery 36.

In a direct-current motor, in general, such a relationship is met that:

$$Va = Ia \times R + K \times Nm,$$

where Va is an armature voltage, Ia an armature current, R an internal resistance, K a coefficient of inductive electromotive force, and Nm a number of revolutions per unit time of the motor. The armature current Ia is proportional to a load imposed on the motor.

In the present embodiment, the absolute duty value D of FIG. 5 is so determined that the steered wheels as turned are restored first with a constant speed till they come near to the neutral position, then with a gradually decreasing speed to finally return to the neutral position. Exemplary, $D_1$ in FIG. 5 is a duty value determined to provide a constant speed $Nm_1$ with which the motor 9 is initially rotated, such that:

$$D_1 = (Ia_1 \times R_1 + K_1 \times Nm_1) / Vcc,$$

where $R_1$ is an internal resistance of the motor 9, $K_1$ a coefficient of inductive electromotive force of same, and $Ia_1$ an armature current corresponding to an estimated constant load on same.

At step 66 subsequent to the step 65, the flags R, L set at the step 59 or 60 have their data output as the rotation direction control signal $T_1$ to the motor drive circuit 40. At step 67, the actual duty value D obtained at the step 65 is output as the armature voltage control signal $T_2$ to the circuit 40. In the case R="1" and L="0", the drive unit 41 in the circuit 40 functions to hold on the FET 42, while feeding the FET 44 with a PWM-controlled drive signal of which the degree of modulation of pulse duration, i.e. PWM factor, is equal to the duty value D. The motor 9 is driven to rotate in such a direction that the steered wheels turned to the right of the neutral position is urged toward the neutral. In the case R="0" and L="1", the FET 45 is driven to be held on and the FET 43 is fed with a PWM-controlled drive signal of the PWM factor is equal to the duty value D, so that the motor 9 rotates so as to have a tendency to return the steering wheel steered to the left of the neutral position to the neutral.

After execution of control process at the step 67, the program flow again goes to the step 54. It thus repeats control processes at the steps 54 to 67 till the steered angle As becomes settled within the band of dead zone k, where the steering wheel and the steered wheels are restored to the neutral positions, respectively.

If the value of steered angle As is judged not unequal to zero at the step 57 or if it is judged not larger than zero at the step 63, the program flow goes to the step 68, as described. At the step 68, both flags R, L are reset "0" to be output. Then, at the step 69, a zero value is substituted for the actual duty value D to be output. The motor 9 is thus driven in neither direction of rotation. In case the motor 9 has been driven till then, the rotation of motor 9 stops. After the step 69, the program flow again goes to the step 52.

The foregoing processes as a whole provide such a control function that, if the switch 20 in its on state is once detected, the steered wheels are restored to the neutral position in an automatic manner even when the switch 20 is turned off. In a modified example, the steered wheels may preferably be restored to the neutral position by detection of operation of the ignition switch, without the provision of a switch for selective use like the pushbutton switch 20.

According to the first embodiment of the invention, there is provided the steering system 1 for vehicles in which the steered wheels can be restored to the neutral position in an automatic manner or at the discretion of the driver, when necessary. If the steered angle As is such a certain value as $As_1$ in FIG. 5, the steered wheels are to be restored first at a constant speed and then, within a vicinity region of the neutral position, at a gradually decreasing speed to finally return to the neutral position.

FIG. 6 shows a steering system 100 for vehicles according to a first modification of the first embodiment of the invention. Description of like parts to the first embodiment is omitted, with or without designating by like reference characters.

The steering system 100 is different from the system 1 of the first embodiment in that as a sensor for detecting a steered position there is employed in place of the rotary potentiometer 7 of system 1 a straight-linear potentiometer 101 for detecting a straight-linear displacement of a rack shaft 6. The potentiometer 101 comprises an elongate resistance sheet 102 fixed to the rack shaft 6 and stretched in the axial direction of the shaft 6, and a sliding contact piece 103 which comes into a sliding contact with a central point of the resistance sheet 102 when a steering wheel is in its neutral position. The function of the system 100 is similar to that of the system 1, and the description is omitted.

FIG. 7 shows a steering system 120 for vehicles according to a second modification of the first embodiment of the invention. Description of like parts to the first embodiment is omitted, with or without designating by like reference characters.

In the system 120, a first shaft fixed at one end thereof to a steering wheel 121 is operatively connected at the other end through a universal joint 123, a second shaft 124, another universal joint 125, and a third shaft 126 to a steering shaft 2. A toothed large-diameter pulley 127 fixed on the first shaft 122 is interconnected by a timing belt 128 with a toothed small-diameter pulley 129 fixed on one external end of the output shaft of an electric motor 130 of which the axis of rotation is paralleled to the first shaft 122. A toothed small-diameter pulley 131 fixed on the other external end of the output shaft of motor 130 is interconnected by a timing belt 132 with a toothed large-diameter pulley 134 fixed on the input shaft of a rotary potentiometer 133.

The steering system 120 is different from the system 1 of the first embodiment in that as a sensor for detecting a steered position there is employed in place of the potentiometer 7 of system 1 the potentiometer 133 for detecting an angular displacement of the motor 130 which is interconnected with the first shaft 122 fixed to the steering wheel 121 and has a reduced speed of rotation when the steering wheel 121 is operated. The function of the system 120 is similar to that of the system 1, and the description is omitted.

FIG. 8 shows a steering system 140 for vehicles according to a third modification of the first embodiment of the invention. Description of like parts to the second modification is omitted, with or without designating by like reference characters.

The steering system 140 employs an electric motor 130 mainly for producing auxiliary steering torque. A steering torque sensor 141 of a strain gauge type is fixed on a first shaft 122. A control circuit 10 normally functions to drive the motor 130 so as to produce auxiliary torque of which the magnitude and acting direction correspond to those of steering torque acting on the shaft 122, in dependence on a detection signal from the sensor 141. A pushbutton switch 20 is connected to the control circuit 10 through a relay 143 which does not close anytime but when a vehicle speed according to a detection signal from a vehicle speed sensor 142 is substantially zero. With the relay 143 closed, a signal from the switch 20 is input to an interrupt terminal of the control circuit 10, which has stored therein an interrupt routine for control processes corresponding to steps 54 to 69 of FIG. 3. In this case, the program flow returns from the step 69 to a main routine.

According to the above third modification, the motor 130 normally functioning to produce auxiliary steering torque is preferably utilized to restore a steering wheel 121 to its neutral position, when necessary. The system 140 is thus greatly advantageous in cost.

Figure 10:
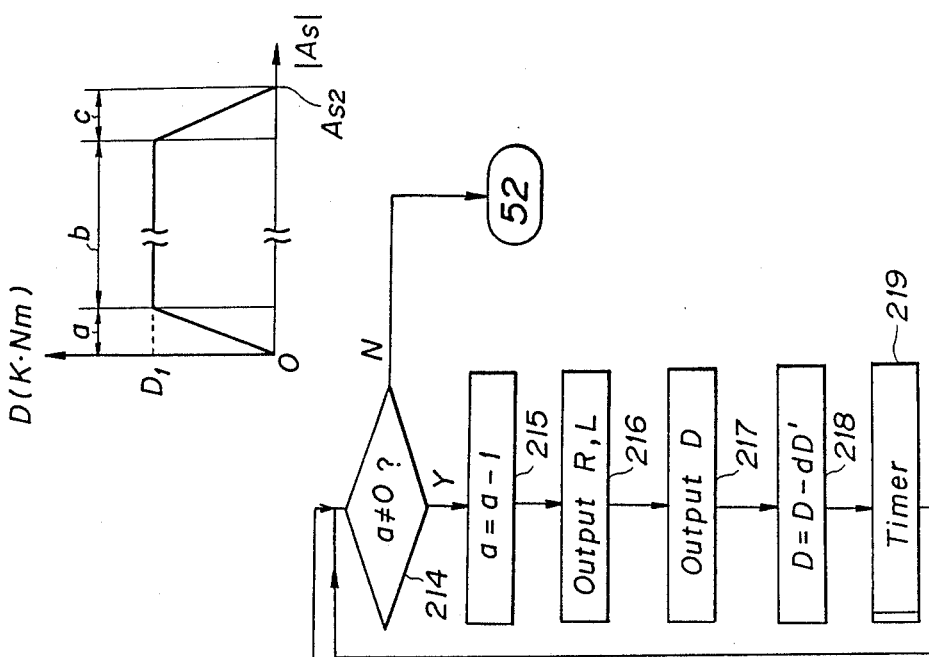
FIG. 10 is a graph showing a relationship between a duty value of a motor drive signal and a steered position with respect to the second embodiment.
Figure 9:
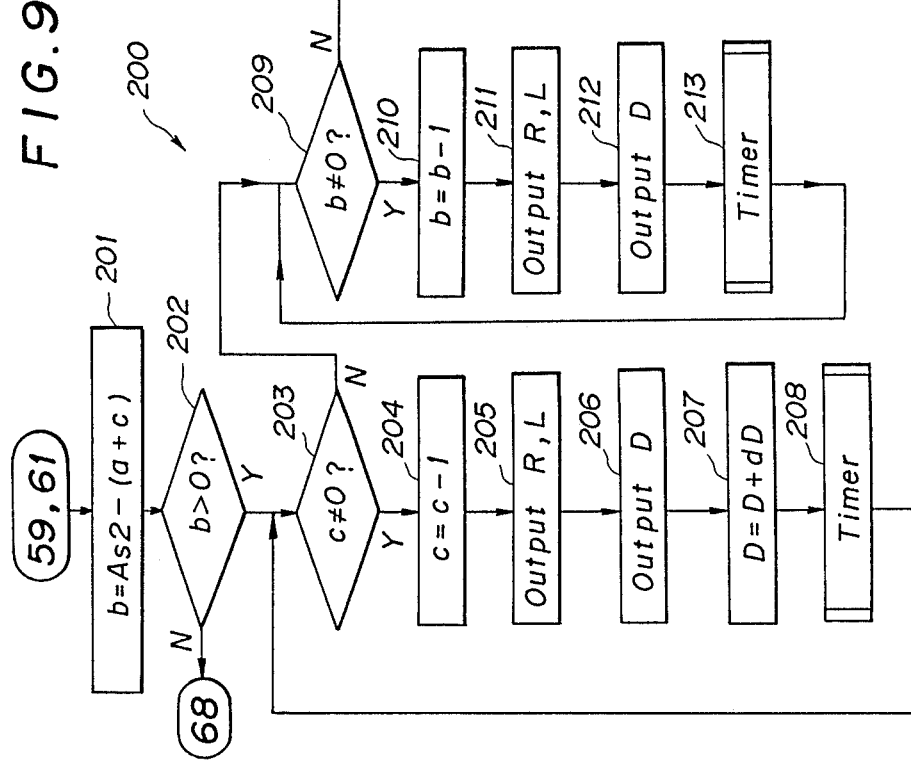
FIG. 9 is a flow-chart of control processes to be executed in a steering system for vehicles according to a second embodiment of the invention, which is equipped with a neutral position restoring device for steered wheels.

FIGS. 9 and 10 are for functional description of a steering system 200 for vehicles according to a second embodiment of the present invention. Mechanical constitution and circuitries of the steering system 200 are the same as those of FIGS. 1 and 2. The second embodiment employs, in place of steps 62 to 67 of FIG. 3, a routine including steps 201 to 219 of FIG. 9 for execution of a control process in the system 200. In the system 200, such a set of absolute duty values $D(K.Nm)$ as shown in FIG. 10 substitutes for that shown in FIG. 5. As in the first embodiment, it is supposed that the load from the road surface has a constant value and a corresponding armature current Ia runs through an electric motor 9. Any duty value of FIG. 10 is to be obtained by calculation in a later described manner, instead of directly reading a stored duty value in a memory as in the case of FIG. 5. The duty value $D(K.Nm)$ in the system 200 is initialized such that $D=0$, when power is applied. In FIG. 10, a and c are predetermined band widths, respectively, and c the width of a band in which the motor 9 is driven to rotate with a constant speed $Nm_1$. The width b corresponds to a steered angle $As_2$ of a steering wheel to be restored to its neutral position. All the widths a, b, c are integers given in terms of degree (°). Steered wheels are to be restored first with a gradually increasing speed from zero to a predetermined speed, then with the predetermined speed all the way till they come to a vicinity of their neutral position, and in the vicinity of the neutral position with a gradually decreasing speed to finally return to the neutral.

At step 201, (a+c) is subtracted from the steered angle $As_2$ as obtained through steps 54 to 61, letting the result be a value of the band width b.

At step 202, a judgment is made as to whether or not the value of thus obtained b is larger than zero. In the case the value of b is larger than zero, the program flow goes to step 203, where a process is performed for restoring the steered wheels to the neutral position. If the value of b is not larger than zero, the flow goes to step 68. When going from the step 202 to the step 203, the flow passes an unshown step, where the band widths a, c as constants and the band width b as a variable have their values set in three counters, respectively. Such values of band widths a, b, c as set in the counters are referred to as contents of corresponding counters in later description of steps 203 to 219, and the corresponding counters are identified by the same letters a, b, c, respectively.

At the step 203, it is judged whether or not the content of counter c is unequal to zero. If it is so, the program flow goes to step 204, where the content of counter c decrements by 1.

At steps 205 and 206, data on flags R, L and the duty value D are output as at steps 66, 67 of FIG. 3, respectively. When the program flow has come from the step 202 to the step 206 for the first time, the duty value D equals to zero.

At step 207, a duty value increment dD is added the duty value D then given, letting the result be a new duty value D. The increment dD is equal to $D1/c$.

At step 208, there is elapsed a predetermined time interval to thereby permit the steering wheel to rotate by one degree. Thereafter, the program flow again goes to the setp 203.

If the content of counter c is judged equal to zero at the step 203, the program flow goes to step 209.

A process through the steps 203 to 208 is thus repeated till such a relationship is met that:

$$c=0, \text{ i.e., } As=As_2 - c.$$

During this time interval, the motor 9 is rotated with a gradually increasing speed from zero to the constant speed $Nm_1$, and also the steering wheel has a gradually increasing speed of rotation from zero to a constant value.

At the step 209, it is judged whether or not the content of counter b is unequal to zero. If it is so, the program flow goes to step 210, where the content of counter b decrements by 1.

At steps 211 and 212, data on the flags R, L and the duty value D are output, respectively. When the program flow has come to the step 212, the duty value D is always $D_1$. At step 213, there is elapsed a predetermined time interval to thereby permit the steering wheel to rotate by one degree. Thereafter, the flow again goes to the setp 209.

If the content of counter b is judged equal to zero at the step 209, the program flow goes to step 214.

A process through the steps 209 to 213 is thus repeated till such a relationship is met that:

$$b=0, \text{ i.e., } As=As_2-(c+b).$$

During this time interval, the motor 9 is rotated with the constant speed $Nm_1$, and also the rotating speed of the steering wheel is kept at the constant value.

At the step 214, it is judged whether or not the content of counter a is unequal to zero. If it is so, the program flow goes to step 215, where the content of counter a decrements by 1.

At steps 216 and 217, data on the flags R, L and the duty value D are output, respectively. When the program flow has come from the step 214 to the step 217 for the first time, the duty value D is necessarily $D_1$.

At step 218, a duty value decrement dD' is subtracted from the duty value D then given, letting the result be a new duty value D. The decrement dD' is equal to $D_1/a$.

At step 219, there is elapsed a predetermined time interval to thereby permit the steering wheel to rotate by one degree. Thereafter, the program flow again goes to the step 214.

If the content of counter a is judged equal to zero at the step 214, the program flow goes to step 52 of FIG. 3.

A process through the steps 214 to 219 is thus repeated till such a relationship is met that:

$$a=0, \text{ i.e., } As = As_2 - (c+b+a) = 0.$$

During this time interval, the motor 9 is rotated with a gradually decreasing speed from the constant speed $Nm_1$ to zero, and also the steering wheel has a gradually decreasing speed of rotation from the constant value to zero.

According to the foregoing second embodiment, signals can be processed in a facilitated manner, in addition to that like effects to the first embodiment are achieved. With control processes of FIG. 9, an MCU 32 is permitted to determine a value of the steered angle As of the steering wheel which varies with time, by a calculation based on the steered angle $As_2$ that is an instantaneous value at the time when a signal $S_1$ is input from a pushbutton switch 20, while determining an armature voltage Va depending on the thus obtained value of steered angle As. It thus is unnecessary to read detection signals $S_2$, $S_3$ in a repeating manner, thus resulting in an increased speed of control process. The second embodiment may preferably be modified to provide such a neutral position restoring characteristic as implied by FIG. 5.

Figure 12:
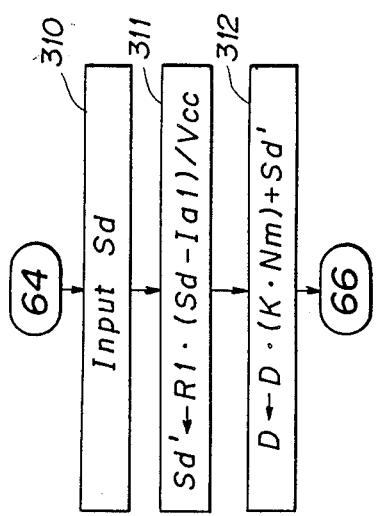
FIG. 12 is a partial flow-chart of control processes to be executed in the third embodiment.
Figure 11:
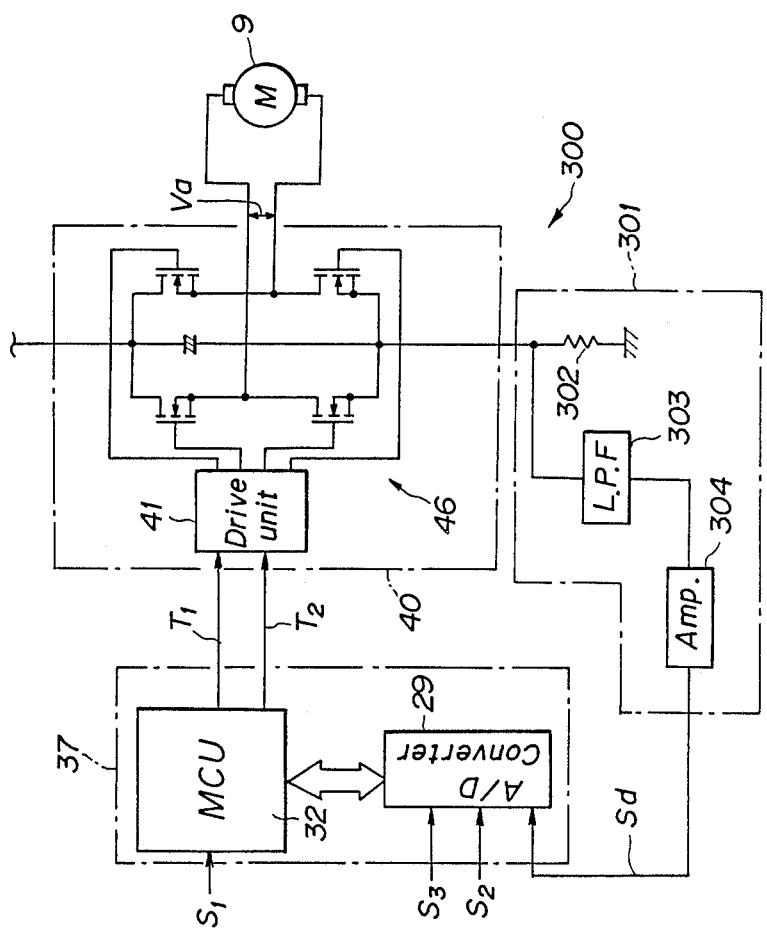
FIG. 11 is a partial circuit diagram of a control circuit in a steering system for vehicles according to a third embodiment of the invention, which is equipped with a neutral position restoring device for steered wheels.

FIG. 11 shows a partial circuit diagram of a control circuit in a steering system 300 for vehicles according to a third embodiment of the invention, and FIG. 12 a flow-chart of an essential part of a control process of the circuit of FIG. 11. Mechanical constitution of the steering system 300 is the same as that the first embodiment shown in FIGS. 1 and 2. Description of like parts to the first embodiment is omitted, with or without designating by like reference characters.

The steering system 300 of the third embodiment of the third embodiment is different from the system 1 of the first embodiment in that a detection circuit 301 for detecting an armature current Ia of an electric motor 9 is installed in a grounded line of a motor drive circuit 40. Moreover, the third embodiment employs, in place of a process of step 65 in FIG. 3, a process having steps 310 to 312 of FIG. 12.

The grounded line of the motor drive circuit 40 includes a resistor 302. The armature current detection circuit 301 comprises a low-pass filter 303 for obtaining a direct-current signal from a potential difference across the resistor 302 and an amplifier 304 for amplifying the signal output from the filter 303. The amplified signal is output as a detection signal Sd of the detection circuit 301, to be input through an A/D converter to an MCU 32.

In the steering system 300, steps 310 to 312 of FIG. 12 substitute for step 65 of FIG. 3, as described. A register for storing data of the detection signal Sd from detection circuit 301 is initialized zero, when power is applied. A flage is employed to prohibit execution of the process of steps 310, 311 when the program flow has come from step 64 to the steps 310, 311 for the first time.

At step 312, a later described duty value correction term Sd' is added to an absolute duty value D(K.Nm) as obtained at the step 64, letting the result be a duty value D. Thereafter, the program flow goes to step 66.

In the case the program flow has come to the steps 310, 311 for the second or repeated time, the following process is executed.

At step 310, the detection signal Sd from armature current detection circuit 301 is read. The signal Sd has a value proportional to the armature current Ia actually conducted across the motor 9.

At step 311, such a calculation is made as:

$$R_1 \times (sd - Ia_1) / Vcc,$$

letting the result be a value of the duty value correction term Sd'. Thereafter, the program flow goes to the step 312.

For a duty value Di set at the step 64 to rotate the motor 9 with an intented speed Nmi, such a relationship is supposed to be met that:

$$Vcc \times Di = Ia_1 \times R_1 + K_1 \times Nmi \quad (1),$$

where $R_1$ is an internal resistance of motor 9, $K_1$ a coefficient of inductive electromotive force of same, and Vcc a supply voltage from a battery 36. The load from the road surface side is supposed to be constant and a corresponding armature current $Ia_1$ is used, as described in conjunction with the first embodiment. It also is understood that $Vcc \times Di = Va$.

Even if an armature voltage Va ($= Vcc \times Di$) according to relationship (1) is applied across the motor 9, the motor 9 will have an armature current Iad corresponding to the road surface load and rotate with a speed Nmd, complying with a relationship such that:

$$Vcc \times Di = Iad \times R_1 + K_1 \times Nmd \quad (2).$$

For a necessary duty value D' for rotating the motor 9 with the intended speed Nmi while permitting the armature current Iad to run through motor 9, such a relationship is met that:

$$Vcc \times D' = Iad \times R_1 + K_1 \times Nm_1 \quad (3).$$

Subtracting relationship (1) from (3) at both sides and dividing by Vcc, $$D' - Di = R_1 \times (Iad - Ia_1) / Vcc \quad (4).$$

The detection signal Sd corresponds to the actual armature current Iad, and expression (4) can be reduced such that:

$$D' - Di = R_1 \times (Sd - Ia_1) / Vcc \quad (4'),$$

where Sd is multiplied by a suitable factor to represent the actual armature current Iad.

At the step 311, the right side of expression (4) is substituted for the duty value correction term Sd', so that:

$$Sd' = D' - D_1 \quad (4'').$$

The absolute duty value D(K.Nm) read at the step 64 is equal to the duty value Di. The circulation $D(K.Nm) + Sd'$ at the step 312 is thus equal to such on addition that:

$$Di + (D' - Di) \tag{5}$$

of which the result is D'. At the step 312, therefore, there is given as an actual duty value D the necessary duty value D' for rotating the motor 9 with the intended rotation speed Nmi.

According to the foregoing third embodiment, the duty value D is determined in consideration of the armature current Ia of motor 9 which varies in correspondence to the actual road surface load. It thus is permitted to rotate the motor 9 with the intented speed Nmi complying with the characteristic shown by FIG. 5, even when the road surface load changes. Steered wheels can thus be restored first with a constant speed, then in a vicinity of their neutral position with a gradually decreasing speed to finally return to the neutral position, even if the road surface load is changed.

Figure 13:
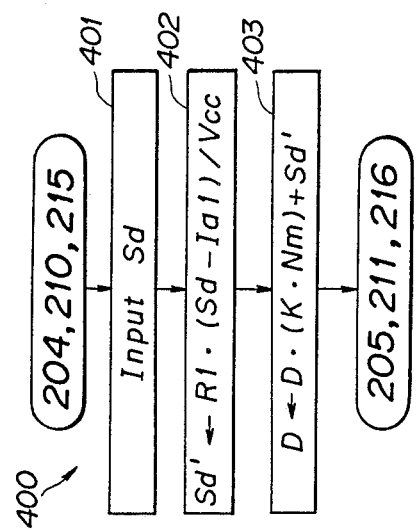
FIG. 13 is a partial flow-chart of control processes to be executed in a steering system for vehicles according to a fourth embodiment of the invention, which is equipped with a neutral position restoring device for steered wheels.

FIG. 13 shows a partial flow-chart of control processes in a steering system 400 for vehicles according to a fourth embodiment of the invention. Mechanical constitution of the steering system 400 is the same as that of the system 300 according to the third embodiment, and the control process of the system 400 is almost the same as that of system 200 according to the second embodiment. In other words, as in the system 300 which is the system 1 partially modified to obtain the duty value D in consideration of the load from road surface side, the steering system 400 is the system 200 partially modified for like purpose.

The steering system 400 employs an additional process having steps 401 to 403 of FIG. 13 to be executed between steps 204 and 205, steps 210 and 211, and steps 215 and 216 of FIG. 9, respectively. The steps 401 to 403 of FIg. 13 are similar to steps 310 to 312 of FIG. 12, and the description is omitted.

According to the foregoing fourth embodiment, steered wheels can be restored first with a gradually increasing speed from zero to a constant speed, then with the constant speed, and in a vicinity of their neutral position with a gradually decreasing speed to finally return to the neutral position, even when the load from road surface side changes.

FIGS. 14 and 15 are for description of a steering system 500 for vehicles according to a fifth embodiment of the invention. The fifth embodiment comprises any one of the first to fourth embodiments partially modified by the provision of an electric generator 501 for detecting the rotation speed of a motor 9 and such a circuit arrangement that an output signal of the generator 501 is fed back to cooperate with an armature voltage responsible control signal $T_2$ to prevent the deviation from an intended value of the rotation speed of motor 9. Mechanical constitution, circuit arrangement, and control process of other portions of the system 500 than illustrated in FIGS. 14 and 15 are similar to those of a corresponding one of the first to fourth embodiments, and the description is omitted.

As shown in FIG. 14, the generator 501 is fixed to the motor 9 to detect the rotation speed of same. The output signal of the generator 501 is input to a control circuit 10.

As shown in FIG. 15, a direction of motor rotation responsible control signal $T_1$ output from an MCU 32 is input to a drive unit 41'.

The signal $T_2$ from MCU 32 is input to a digital to analogue converter 502 of which an output signal is fed to a non-inverted input terminal of a differential amplifier 503. The amplifier 503 has an output signal $T_2'$ thereof fed to a plus (+) terminal of a comparator 504 of which a minus (−) terminal is fed with an output signal Tr from a triangular wave generator 505. The signal Tr is a triangular pulse signal of a constant frequency. The comparator 504 compares the signal $T_2'$ from amplifier 503 with the triangular wave signal Tr, and outputs to the drive unit 41' a rectangular pulse signal $T_2''$ with the same level as an output voltage $V_1$ of a voltage stabilizer 38 when the signal $T_2'$ is larger than signal Tr. The drive unit 41' outputs drive signals to a bridge circuit 46. The comparator 504, triangular wave generator 505, and drive unit 41' cooperate with one another to constitute the drive unit 41 of FIG. 2.

The output signal of the generator 501 is input to an absolute value amplifier 511, where the absolute value of its voltage is amplified. The generator 501 and amplifier 511 constitute a rotation speed detection circuit 510 of the motor 9. The detection circuit 510 feeds an inverted input terminal of the differential amplifier 503 with a feedback signal Sf. The signal $T_2'$ from the differential amplifier 503 is output in the form of a differential that represents the deviation of rotation speed of motor 9 with respect to the armature voltage control signal $T_2$.

In the steering system 500, the signal Sf from the generator 501 detecting the rotation speed of the motor 9 is fed back with respect to the armature voltage control signal $T_2$, so that the deviation of rotation speed of motor 9 from an intended value is prevented by circuit arrangement. The motor 9 is thus controlled to rotate with an intended speed that the control signal $T_2$ is responsible for.

Incidentally, in the flow-chart of FIG. 3, the program flow after step 67 goes to step 54, so that a process for restoring the steered wheels to the neutral position advances till it is complete, if once started by detection of the pushbutton switch 20 turned on. The steered wheels are thus to be restored to the neutral position, even if the switch 20 is turned off while the steered wheels are in the way of being returned by the motor 9. The program flow however may be let to go from the step 67 to step 52, if it is desirable to continue the neutral position restoring process of the steered wheels only while the switch 20 is held on.

The present invention is applicable to any type of electric power steering system, as exemplified by the modification of FIG. 8.

In the foregoing respective embodiments, the steered wheels are front wheels. The present invention will permit not only front wheels but also rear wheels to be restored to their neutral position, when applied to various four-wheel steered vehicles which have been proposed in recent years.

Although there has been described what is at present considered to be the preferred embodiment of the invention with modifications and alternative embodiments thereof, it will be understood that the present invention may be embodied in other specific forms without departing from essential characteristics thereof. The present embodiments are therefore to be considered in all respects as illustrative but not restrictive. The scope of the invention is indicated by the appended claims rather than by the foregoing description.

I claim:
1. A steering system for vehicles, comprising:
a steered wheel;
a steering mechanism for transmitting a steering operation of a steering wheel to said steered wheel; and means which is operatively connected to said steering mechanism and forceably restores said steered wheel from a current position thereof to a neutral position thereof independent of vehicle movement.

2. A steering system for vehicles comprising:
a steered wheel;
a steering mechanism for transmitting a steering operation of a steering wheel to said steered wheel; and
means which is operatively connected to said steering mechanism and restores steered wheel from a current position thereof to a neutral position thereof, as necessary;
wherein said means restoring said steered wheel to said neutral position comprises detection means for operatively detecting a turned position of said steered wheel, switch means for producing a command signal for restoring said steered wheel to said neutral position, drive means for turning said steered wheel through said steering mechanism, and control means which receives said command signal from said switch means and a detection signal from said detection means and controls said drive means to restore said steered wheel to said neutral position.

3. A steering system for vehicles according to claim 2, wherein:
said drive means comprises an electric motor; and
said control means impresses an armature voltage signal as a drive signal to said motor, when fed with said command signal from said switch means.

4. A steering system for vehicles according to claim 3, wherein:
said control means impresses said drive signal to said motor, when fed with said command signal from said switch means, so that said steered wheel is restored first with a constant speed and in a vicinity of said neutral position with a gradually decreasing speed to finally return to said neutral position.

5. A steering system for vehicles according to claim 3, wherein:
said control means impresses said drive signal to said motor, when fed with said command signal from said switch means, so that said steered wheel is restored first with a gradually increasing speed from a zero speed to a constant speed, then with said constant speed to be held, and in a vicinity of said neutral position with a gradually decreasing speed to finally return to said neutral position.

6. A steering system for vehicles according to claim 3, wherein:
said control means comprises a micro-computer system having a memory; and
said micro-computer system determines to impress to said motor the magnitude of said armature voltage signal in dependence on data stored in advance in said memory with correlations to various turned positions of said steered wheel.

7. A steering system for vehicles according to claim 3, wherein:
said control means comprises a micro-computer system having a memory; and
said micro-computer system determines to impress to said motor the magnitude of said armature voltage signal in dependence on a varying turned position of said steered wheel obtained from time to time by a calculation based on said turned position at the time when said command signal from said switch means is fed.

8. A steering system for vehicles according to claim 3, wherein:
said control means includes means for detecting an armature current of said motor; and
said control means impresses said armature voltage signal to said motor, taking into account a detection signal from said armature current detecting means.

9. A steering system for vehicles according to claim 3, wherein:
said control means comprises armature voltage signal generating means for impressing said armature voltage signal to said motor, and speed detecting means for detecting a rotation speed of said motor and feeding back a detection signal thereof to said armature voltage signal generating means. pg,41

10. A steering system for vehicles according to claim 2, wherein:
said switch means comprises a manual switch provided in a vicinity of said steering wheel.

11. A steering system for vehicles according to claim 2, further comprising auxiliary torque producing means for operatively applying auxiliary steering torque to said steering wheel, wherein:
said drive means comprises said auxiliary torque producing means.

* * * * *